United States Patent [19]
Matsufuji et al.

[11] Patent Number: 4,481,253
[45] Date of Patent: Nov. 6, 1984

[54] PROCESS FOR PREPARING FERROMAGNETIC METAL POWDER AND A MAGNETIC RECORDING MEDIUM INCLUDING THE POWDER

[75] Inventors: Akihiro Matsufuji; Shizuo Umemura; Akira Kasuga; Hajime Miyatuka; Goro Akashi, all of Kanagawa, Japan

[73] Assignee: Fuji Photo Film Co., Ltd., Kanagawa, Japan

[21] Appl. No.: 448,651

[22] Filed: Dec. 10, 1982

[30] Foreign Application Priority Data

Dec. 10, 1981 [JP] Japan ................................. 56-199109
Dec. 10, 1981 [JP] Japan ................................. 56-199110

[51] Int. Cl.$^3$ ............................................. H01F 10/02
[52] U.S. Cl. .................................. 428/323; 75/0.5 BA; 428/336; 428/337; 428/457; 428/694; 428/695; 428/900
[58] Field of Search ................ 427/132, 128; 428/323, 428/336, 337, 457, 694, 695, 900; 75/0.5 BA

[56] References Cited
FOREIGN PATENT DOCUMENTS 2705835 8/1977 Fed. Rep. of Germany .
0084033 6/1980 Japan .

Primary Examiner—Bernard D. Pianalto
Attorney, Agent, or Firm—Sughrue, Mion, Zinn, Macpeak & Seas

[57] ABSTRACT

A process for preparing a ferromagnetic metal powder and a magnetic recording medium utilizing that powder are disclosed. The ferromagnetic metal powder is prepared by heat-treating an acicular iron oxyhydroxide or an acicular iron oxide powder prepared from the acicular iron oxyhydroxide in a non-reducing gas at a temperature of from 300° C. to 1000° C. or in a reducing gas at a temperature of from 150° C. to 500° C. The heat-treated material is washed and then reduced under heating. The ferromagnetic metal powder prepared in this manner is dispersed in a binder and cated on a non-magnetic base to form a magnetic recording medium. By utilizing the washing step followed by heat-treating preparing the ferromagnetic metal powder a large amount of water soluble impurities are removed from the metal powder. The metal powder produced according to this disclosed process as excellent oxidation stability and ability to resist corrosion. Accordingly, the magnetic recording medium prepared utilizing this powder has an excellent ability to resist oxidation and corrosion even when subjected to adverse conditions.

16 Claims, No Drawings

PROCESS FOR PREPARING FERROMAGNETIC METAL POWDER AND A MAGNETIC RECORDING MEDIUM INCLUDING THE POWDER

FIELD OF THE INVENTION

The present invention relates to a process for preparing a ferromagnetic powder and a magnetic recording medium incorporating the powder.

BACKGROUND OF THE INVENTION

Magnetic recording tapes of various types have been developed for use as magnetic recording medium using a ferromagnetic metal powder with a higher saturation magnetization ($\sigma s$) and higher coercivity (Hc). In connection with these tapes, various attempts have been made at improving the recording density and reproducing output level.

Ferromagnetic metal powders have excellent magnetic properties. However, their chemical stability is insufficient and such powders are easily oxidized and corroded. Therefore, a magnetic recording medium using such powder has stability problems with the passage of time. For example, when such a magnetic recording medium is repeatedly wet and then dried, materials which occurs on the surface of the magnetic recording medium affect the uniformity and smoothness of the medium. Therefore, correct recording reproducing operations are not possible with the change of output level and increase of dropout.

SUMMARY OF THE INVENTION

An object of the invention is to provide a process for preparing ferromagnetic metal powders having excellent oxidation stability and anti-corrosive property.

Another object of the invention is to provide a process for preparing ferromagnetic metal powders which provide better dispersing property.

Yet another object of the invention is to provide a magnetic recording medium using a ferromagnetic metal powder having an excellent ability to resist oxidation and corrosion.

As the results of various research to attain the above objects of the invention, the inventors have found that there are relationships between oxidation stability, anti-corrosive property and dispersing property of a ferromagnetic metal powder, and the water soluble impurities in a ferro-magnetic metal powder. They have also found that the water soluble impurities constituting the ferromagnetic metal powder can be decreased by a washing step which is carried out during a heat treatment process. The powder which has been treated in this manner is then dispersed in a binder and placed on a support to form the recording medium.

In this invention, the water soluble impurities can be defined as impurities which are dissolved out in water when a ferromagnetic metal powder is dipped into water. The amount of impurities present can be measured by an atomic absorption method or electrophoresis method by using various metal components which are dissolved out in water when 1 g of ferromagnetic metal powder is stirred in 100 ml of water for 1 hour.

DETAILED DESCRIPTION OF THE PREFERRED EMBODIMENTS

The following processes for preparing a ferromagnetic metal powder are known:

(1) A process which comprises heat-decomposing an organic acid salt of ferromagnetic metal powder and then reducing it by a reducing gas;

(2) A process which comprises reducing an acicular iron oxyhydroxide which can contain one or more other metals, or an acicular iron oxide which is obtained by heating the acicular iron oxyhydroxide in a reducing gas;

(3) A process which comprises heat-decomposing a metal carbonyl compound;

(4) A process which comprises evaporating a ferromagnetic metal in an inactive gas under low pressure;

(5) A process which comprises reducing an aqueous solution of metal salt which provides a ferromagnetic metal powder in the presence of a reducing substance such as a borohydride compound, hypophosphite or hydrazine;

(6) A process which comprises depositing a ferromagnetic metal powder by using a mercury cathode and then separating the powder from mercury.

The present invention relates to a method of treating ferromagnetic metal powder which was produced by the process disclosed in (2). Furthermore, the invention relates to the recording media produced utilizing powder treated in this manner.

An acicular iron oxyhydroxide employed in the invention can be obtained by conventional methods, for example, by neutralizing an aqueous solution of ferrous salt or an aqueous solution which is a mixture of ferrous salt and ferric salt with an alkaline agent and oxidizing it with an oxidizing gas. If necessary, a metal other than iron (e.g. Ti, V, Cr, Mn, Co, Ni, Cu, Zn, Si, P, Mo, Sn, Sb, Ag, etc.) can be added alone or in combination before, during or after the above steps. An acicular iron oxyhydroxide powder particles preferably have a size of 0.1 to 2.0 microns and an acicular ratio of 2/1 to 50/1.

Where a ferromagnetic metal powder is prepared by the process (2) as disclosed above, the impurities which are included in the ferromagnetic powder are introduced into the powder during the wet reaction step for obtaining iron oxyhydroxide.

The impurities on the surface of the iron oxyhydroxide can be removed in some degree by a washing step which is conventionally carried out after the wet reaction step. However, impurities that are included in the inner portion of the powder migrate out of the iron oxyhydroxide onto the surface of the powder during the heating step for obtaining a ferromagnetic metal powder. Accordingly, there are much more impurities on the surface of the powder than on the surface of the iron oxyhydroxide. Therefore, water soluble impurities of thus obtained ferromagnetic metal powder cannot be removed sufficiently by a conventional washing step of iron oxyhydroxide. According to the invention, the water soluble impurities can be removed by adding an additional washing step to the heat-treatment step.

The additional washing step of the invention is carried out directly after the material to be reduced (i.e. acicular iron oxyhydroxide or acicular iron oxide powder) is heat-treated in an inactive gas or an oxidizing gas, or after the material is reduced in a reducing gas under heating to $Fe_3O_4$ or FeO. However, it is not preferred that the additional washing step be carried out after the α-Fe component is produced, because the shape of ferromagnetic powder is damaged by accelerated oxidation and corrosion.

As the temperature of heat-treatment of the material to be reduced in an inactive gas or an oxygen-containing gas is increased, the effects of the invention are better. However, if the temperature is too high, the shape of the powder is injured, and if the temperature is too low, the effects of the invention are not sufficient because the impurities are not sufficient migrated out onto the surface of the powder. The inventors have found, as the result of many experiments, that the temperature is preferably 300° C. to 1000° C. and more preferably 400° C. to 800° C.

The temperature must be kept low if the additional washing step is carried out after $Fe_3O_4$ or FeO is obtained by heat-treatment of the material to be reduced in a reducing gas. This is because sintering proceeded more quickly in a reducing gas than in non-reducing gas. The inventors have found as the results of many experiments that the temperature is preferably 150° C. to 500° C., more preferably 200° C. to 400° C.

In general, any type of water can be used for the additional washing step, for example, well water, city water distilled water, etc., preferably distilled water. However, the less impurities contained in water, the better the results of the invention. Furthermore, the temperature of the water which is used for the additional washing step is not particularly limited, but a higher temperature is better.

Further, the preferred heating temperature in the reduction step after the washing step is about 300° to 550° C.

A ferromagnetic metal powder prepared by the process of the invention can be exposed to air after conducting a well-known gradual oxidation treatment. Examples of such methods include a method of stabilizing the powder while controlling the oxygen concentration in an oxygen-containing inactive gas, or a method for stabilizing the powder while drying an organic solvent after dipping the powder in the solvent that is not reacted with the metal powder.

The invention will be explained in more detail by the following examples. However, this invention is not limited by the following examples.

EXAMPLE 1

An acicular α-FeOOH (length 0.6 micron; acicular ratio 20; Sample Y-1) containing 5 wt% of Ni and sufficiently washed with water was heated in air at 300° C. for 2 hours to provide $\alpha\text{-}Fe_2O_3$ powder (Sample 2-1). The powder was washed with a distilled water until the electro-conductivity of the filtrate remained constant, and was reduced in hydrogen gas at 380° C. for 6 hours to provide α-Fe powder containing Ni. The powder was dipped in toluene and then air dried at 40° C. to obtain a ferromagnetic metal powder (Sample M-1).

EXAMPLE 2

The Sample Y-1 was heated in air at 500° C. for 2 hours to provide $\alpha\text{-}Fe_2O_3$ powder (Sample R-2). The same procedure as in Example 1 for washing and heat treatment steps was repeated to provide a Ni-containing α-Fe powder (Sample M-2).

EXAMPLE 3

The same procedure as in Example 2 was repeated except that water was used for washing the Sample R-2 to provide a Ni-containing α-Fe powder (Sample M-3).

EXAMPLE 4

The Sample Y-1 was heated in air at 1000° C. for 2 hours to provide a Ni-containing $\alpha\text{-}Fe_2O_3$ powder (Sample R-3). The powder was washed and heated by the same procedure as in Example 1 to provide a Ni-containing α-Fe powder (Sample M-4).

EXAMPLE 5

The Sample R-2 was heated in a hydrogen gas at 300° C. for 2 hours to provide a magnetite powder (Sample B-1). The powder was washed and heated by the same procedure as in Example 1 to provide a Ni-containing α-Fe powder (Sample M-5).

EXAMPLE 6

An acicular α-FeOOH (length 0.4 micron; acicular ratio 20; Sample Y-2) containing 0.5 wt% of Si was sufficiently washed with water and heated in a nitrogen gas at 300° C. for 2 hours to provide a Si-containing $\alpha\text{-}Fe_2O_3$ (Sample R-4). The powder was washed with a distilled water until the electro-conductivity of the filtrate remained constant, and was reduced in a hydrogen gas at 380° C. for 6 hours to provide a Si-containing α-Fe powder. The powder was allowed to stand in a nitrogen gas containing 1% of air for 30 minutes. The partial pressure of air was increased 2 times for every 30 minutes, and after 4 hours, only air was introduced for a gradual oxidation treatment to obtain a ferromagnetic metal powder (Sample M-6).

EXAMPLE 7

The Sample Y-2 was heated in a nitrogen gas at 500° C. for 2 hours to provide a Si-containing $\alpha\text{-}Fe_2O_3$ powder (Sample R-5). The powder was washed, heat-treated and gradually oxidized by the same procedure as in Example 6 to provide a Si-containing α-Fe powder (Sample M-7).

EXAMPLE 8

The Sample Y-2 was heated in a nitrogen gas at 800° C. for 2 hours to provide a Si-containing $\alpha\text{-}Fe_2O_3$ powder (Sample R-6). The powder was washed, heat-treated and gradually oxidized by the same procedure as in Example 6 to provide a Si-containing α-Fe powder (Sample M-8).

EXAMPLE 9

The Sample R-5 was heated in a hydrogen gas at 300° C. for 2 hours to provide a Si-containing magnetite powder (Sample B-2). The powder was washed, heat-treated and gradually oxidized by the same procedure as in Example 6 to provide a Si-containing α-Fe powder (Sample M-9).

COMPARATIVE EXAMPLE 1

The same procedure as in Example 1 was repeated by using Sample R-2 through the reducing step and gradual oxidizing step except that the washing step was omitted to provide a Ni-containing α-Fe powder (Sample MR-1).

COMPARATIVE EXAMPLE 2

The same procedure as in Example 6 was repeated by using Sample R-5 through the reducing step and gradual oxidizing step except that the washing step was omitted to provide a Si-containing α-Fe powder (Sample MR-2).

Stationary magnetic properties, amounts of water soluble impurities and stationary magnetic properties after ferromagnetic powders were allowed to stand for 1 week in an atmosphere of 60° C. and 90% RH (relative humidity) are shown in Table 1.

TABLE 1

| Sample No. | Stationary magnetic properties (Hm = 10 KOe) | | Stationary magnetic properties after being allowed to stand for 1 week at 60° C., 90% RH | | Amount of water soluble impurities (ppm) | | | | | |
|---|---|---|---|---|---|---|---|---|---|---|
| | Hc (Oe) | σs (emu/g) | Hc (Oe) | σs (emu/g) | Na$^+$ | Ca$^{2+}$ | Mg$^{2+}$ | K$^+$ | SO$_4^{2-}$ | Cl$^-$ |
| M-1 | 1180 | 145 | 1220 | 138 | 80 | 110 | 70 | | 70 | 50 |
| M-2 | 1250 | 148 | 1250 | 146 | | 20 | 30 | | | |
| M-3 | 1230 | 146 | 1230 | 141 | 20 | 70 | 120 | 20 | 40 | 180 |
| M-4 | 1010 | 158 | 1000 | 155 | | 30 | | | | |
| M-5 | 1260 | 149 | 1260 | 147 | | 20 | | | | |
| M-6 | 1390 | 140 | 1410 | 132 | 90 | 130 | 80 | | 80 | 50 |
| M-7 | 1480 | 143 | 1480 | 140 | 20 | 40 | 30 | | 20 | 30 |
| M-8 | 1370 | 150 | 1380 | 148 | | 20 | | | | |
| M-9 | 1480 | 145 | 1480 | 143 | 460 | 30 | | | | |
| MR-1 | 1210 | 138 | 1220 | 91 | 460 | 630 | 430 | 70 | 630 | 380 |
| MR-2 | 1420 | 132 | 1390 | 80 | 520 | 610 | 520 | 60 | 710 | 510 |

Mark " " means impossible to measure the amount of impurities because the amount was too small.

It is apparent from Table 1 that ferromagnetic metal powders in Examples contain less water soluble impurities and are less deteriorated in high temperature and high humidity than the metal powders shown in Comparative Examples.

Ferromagnetic powders treated in accordance in the present invention are dispersed in a binder. The binder used in the invention is comprised of polymers generally used as binders in magnetic recording layers. Examples of such binders include polyester resin, cellulose resin, polyuretane resin, phenol resin, epoxy resin, polyamide resin or polymer and copolymer of methacrylic acid ester, styrene, acrylonitrile, butadiene, vinyl ester, vinyl chloride, vinylidene chloride and acrylamide, which can be used alone or in combination.

In addition to the above binder, a thermosetting resin such as polyisocyanate compound or polyepoxy compound can be used to improve the durability of the magnetic recording layer.

The mixing ratio of ferromagnetic powder and binder is 100 parts by weight of the powder to about 8 to 25 parts by weight of the binder. The dry thickness of the magnetic recording layer is about 0.5 to 6 microns.

Examples of useful lubricants for the magnetic recording layer include a silicone oil such as polycyloxane; an inorganic powder such as graphite, tungsten disulfide or carbon black; a plastic fine particle such as polyethylene fine particles or polytetrafluoroethylene fine particles; a long chain fatty acid; an ester of fatty acid; and fluorocarbons. The lubricants can be used alone or in combination in an amount of 0.2 to 20 parts by weight based on 100 parts by weight of binder.

Useful anti-abrasive agents which may be used in the invention include molten-alumina, carbon silicate, chromium oxide ($Cr_2O_3$), corundum and diamond, which has an average diameter of 0.05 to 5 microns. Such anti-abrasive agents are used in an amount of 0.5 to 20 parts by weight based on 100 parts of binder.

Antistatic agents which may be used in the invention include an electroconductive powder such as graphite, carbon black or carbon black graft polymer; a natural surface active agent such as saponin; a non-ionic surface active agent such as alkylene oxides, glycerols or glycidols; a cationic surface active agent such as higher alkylamines, quarternary ammonium salts, pyridine and other heterocyclic ring compounds, phosphonium compounds or sulfonium compounds; an anionic surface active agent having an acid group such as a carboxylic acid, a sulfonic acid, a phosphoric acid, sulfuric acid ester or phosphoric acid ester; and an amphoteric surface active agent such as amino acids, aminosulfonic acids, sulfuric acid esters of aminoalcohols or phosphoric acid esters of aminoalcohols.

A magnetic recording layer of the invention can be provided by dissolving the above composition in an organic solvent to prepare a coating composition. The obtained composition is then coated on a non-magnetic support.

Examples of the organic solvents used for preparing the coating composition include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate or glycol acetate monoethyl ether; ethers such as ether, glycol dimethyl ether, glycol monoethyl ether, tetrahydrofuran or dioxane; aromatic hydrocarbons such as benzene, toluene or xylene; and chlorinated hydrocarbons such as methylene chloride, ethylene chloride, carbon tetrachloride, chloroform, ethylene chlorohydrin, chlorobenzene or dichlorobenzene.

The thickness of support used in the invention is about 5 to 50 microns, preferably 10 to 40 microns. Typical examples of the supports include plastic films, e.g. polyesters such as polyethylene terephthalate or polyethylene-2,6-naphthalate, polyolefines such as polypropylene, cellulose derivatives such as cellulose triacetate or cellulose diacetate, and polycarbonate; non-magnetic metal sheets or foils such as Cu, Al or Zn; ceramics such as glass, porcelain or earthenware. The shape or form of the supports may be film, tape, sheet, etc.

Methods for coating a magnetic recording layer on a support include an air doctor coating method, a blade coating method, an air knife coating method, a squeeze coating method, a dip coating method, a reverse roll coating method, a transfer roll coating method, a gravure coating method, a kiss coating method, a cast coating method or a spray coating method, which is disclosd in Engineering of coating methods, pages 253 to 277, published by Asakura Shoten (Japan) in Mar. 20, 1971.

A magnetic recording layer coated on a support can be subjected to a smoothening treatment before drying or it may be subjected to calendering after drying to increase magnetic properties such as S/N ratio.

The invention will be explained in more detail by the following examples. In the examples, "part" means "part by weight".

EXAMPLE 10

An acicular α-FeOOH (length 0.6 micron; acicular ratio 20) containing 5 wt% of Ni which was sufficiently washed with well water was heated in air at a temperature of 500° C. for 2 hours to obtain a powder of α-$Fe_2O_3$. The powder was washed with a distilled water until the electroconductivity of the filtrate remained constant. The powder was then reduced in a hydrogen gas at 380° C. for 6 hours to obtain a α-Fe powder containing Ni. The powder was dipped in toluene and then the toluene was removed in air at a temperature of 40° C. The thus obtained ferromagnetic metal powder had the following magnetic properties; coercivity (Hc): 1250 Oe and saturation magnetization: 148 emu/g.

In a ballmill, 300 parts of the metal powder and the following composition were kneaded and dispersed.

| | |
|---|---|
| Vinyl chloride-vinyl acetate copolymer ("VMCH" manufactured by U.C.C.) | 30 parts |
| Polyurethane resin ("Estane 5701" manufactured by Goodrich Co.) | 20 parts |
| Dimethyl polysiloxane (polymerization degree: about 60) | 6 parts |
| Butyl acetate | 600 parts |
| Methyl isobutyl ketone | 300 parts |

After dispersing the composition, 25 parts of a 75 wt% ethyl acetate solution of triisocyanate compound ("Dismodul L-75" manufactured by Bayer A. G.) were added and the mixture was dispersed for 1 hour under high speed shearing force to provide a magnetic coating composition.

The thus obtained coating composition was coated on polyester film to a dry thickness of 4 microns. The film was subjected to magnetic orientation and then dried. The dried film was subjected to surface treatment and then cut into a suitable width to provide a magnetic recording tape.

EXAMPLE 11

An acicular α-FeOOH (length 0.4 micron; acicular ratio 20) containing 0.5 wt% of Si which was sufficiently washed with well water was heated in nitrogen gas at 500° C. for 2 hours. After the washing step and reducing step as in Example 10 were carried out, the reaction mixture was allowed to stand in a nitrogen gas containing 1% air for 30 minutes. The partial pressure of air was increased to 2 times for every 30 minutes such that the air content in the gas becomes 2%, 4%, 8%, 16%, 32%, 64% and 100%, and after 4 hours, only air was introduced for a gradual oxidation treatment to obtain a ferromagnetic metal powder. The powder had the following magnetic properties; coercivity (Hc): 1480 Oe, saturation magnetization (σs): 143 emu/g. The same procedure as in Example 10 was repeated to obtained a coating composition and a magnetic recording tape.

COMPARATIVE EXAMPLES 3 AND 4

The same procedure as in Examples 10 and 11 was repeated except that the washing step before the reducing step was omitted to obtain a magnetic recording tape using a ferromagnetic metal tape. The coercivity (Hc) and saturation magnetization (σs) of the thus obtained metal powder were 1210 Oe, 1420 Oe and 138 emu/g, 132 emu/g, respectively.

The squareness ratio and decreasing ratio of saturation magnetic flux density of magnetic recording tapes of Examples 10 and 11 and Comparative Examples 3 and 4 are shown in Table 2. The decreasing ratio of saturation flux density was measured by using magnetic recording tapes which were allowed to stand in an atmosphere of 60° C. and 90% RH (relative humidity) for 1 hour.

TABLE 2

| Example No. | Squareness Ratio | Decreasing Ratio of Saturation Flux Density (%) |
|---|---|---|
| Example 10 | 0.78 | 1 |
| Example 11 | 0.79 | 2 |
| Comparative Example 3 | 0.75 | 10 |
| Comparative Example 4 | 0.76 | 8 |

The magnetic recording tapes of Examples 10 and 11, and Comparative Examples 3 and 4 were then tested by 12 cycles according to Method II-2 of JIS, Japan Industrial Standard, C5024 (test method for anti-wetting of electronic parts), and changes in the surfaces of the magnetic tapes were observed by a microscope. The results are shown in Table 3.

TABLE 3

| Example No. | Observation of Surfaces |
|---|---|
| Example 10 | No change |
| Example 11 | " |
| Comparative Example 3 | Uneven matter and stain occur |
| Comparative Example 4 | " |

The results shown in Tables 2 and 3 clearly show that a magnetic recording medium having an improved dispersing property and an improved durability can be prepared by conducting a washing step before a reducing step.

While the invention has been described in detail and with reference to specific embodiments thereof, it will be apparent to one skilled in the art that various changes and modifications can be made therein without departing from the spirit and scope thereof.

What is clamed is:

1. A process for preparing a ferromagnetic metal powder, comprising the steps of:
   heat-treating an acicular iron oxyhydroxide or an acicular iron oxide powder obtained from the acicular iron oxyhydroxide in a non-reducing gas at a temperature of from 300° C. to 1000° C. or in a reducing gas at a temperature of from 150° C. to 500° C.;
   washing the resulting heat-treated acicular iron oxyhydroxide or acicular iron oxide powder; and reducing the washed products under heating.

2. A process for preparing a ferromagnetic metal powder as claimed in claim 1, wherein the acicular iron oxyhydroxide includes one or more other metals.

3. A process for preparing a ferromagnetic metal powder as claimed in any of claims 1 or 2, wherein the acicular iron oxyhydroxide is further comprised of at least one additional metal component selected from the group consisting of Ti, V, Cr, Mn, Co, Ni, Cu, Zn, Si, P, Mo, Sn, Sb and Ag.

4. A process for preparing a ferromagnetic metal powder as claimed in any of claims 1, 2 or 3, wherein the acicular iron oxyhydroxide powder is in the form of particles having a size of 0.1 to 2.0 microns.

5. A process for preparing a ferromagnetic metal powder as claimed in claim 4, wherein the acicular iron oxyhydroxide powder particles have an acicular ratio of 2/1 to 50/1.

6. A process for preparing a ferromagnetic metal powder as claimed in claim 1, wherein the heat-treating step in a non-reducing gas is carried out at a temperature of from 400° C. to 800° C.

7. A process for preparing a ferromagnetic metal powder as claimed in claim 1, wherein the heat-treating step in a reducing gas is carried out at a temperature of from 200° C. to 400° C.

8. A process for preparing a ferromagnetic metal powder as claimed in claim 1, wherein the reduction step after the washing step is carried out at a heating temperature of from about 300° C. to about 550° C.

9. A magnetic recording medium, comprising:
a non-magnetic support base; and
a magnetic layer coated on a surface of the support base, the layer being comprised of a binder and a ferromagnetic metal powder prepared by the process of heat-treating an acicular iron oxyhydroxide or an acicular iron oxide powder obtained from the acicular iron oxyhydroxide in a non-reducing gas at a temperature of from 300° C. to 1000° C. or in reducing gas at a temperature of from 150° C. to 500° C., washing it and then reducing it under heating.

10. A magnetic recording medium as claimed in claim 9, wherein the acicular iron oxyhydroxide includes one or more other metals.

11. A magnetic recording medium as claimed in claim 9, wherein the mixing ratio of the ferromagnetic powder and the binder is 100 parts by weight of the powder to about 8 to 25 parts by weight of the binder.

12. A magnetic recording medium as claimed in claim 9, wherein the magnetic layer has a thickness of from about 0.5 to about 6 microns.

13. A magnetic recording medium as claimed in claim 12, wherein the magnetic layer is further comprised of a lublicant present in an amount of 0.2 to 20 parts by weight based on 100 parts by weight of the binder.

14. A magnetic recording medium as claimed in claim 13, wherein the magnetic layer is further comprised of an anti-abrasive agent, the anti-abrasive agent being present in an amount of 0.5 to 20 parts by weight based on 100 parts of binder and the anti-abrasive agent having an average diameter of 0.05 to 5 microns.

15. A magnetic recording medium as claimed in claim 9, wherein the non-magnetic support base has a thickness of from about 5 to about 50 microns.

16. A magnetic recording medium as claimed in claim 15, wherein the non-magnetic support base has a thickness of from 10 to 40 microns.

* * * * *